(12) United States Patent
Clark

(10) Patent No.: US 8,966,990 B2
(45) Date of Patent: Mar. 3, 2015

(54) MEMS DEVICES EXHIBITING LINEAR CHARACTERISTICS

(75) Inventor: Jason Vaughn Clark, Carmel, IN (US)

(73) Assignee: Purdue Research Foundation, West Lafayette, IN (US)

( * ) Notice: Subject to any disclaimer, the term of this patent is extended or adjusted under 35 U.S.C. 154(b) by 231 days.

(21) Appl. No.: 13/371,024

(22) Filed: Feb. 10, 2012

(65) Prior Publication Data

US 2012/0204643 A1    Aug. 16, 2012

Related U.S. Application Data

(60) Provisional application No. 61/441,760, filed on Feb. 11, 2011.

(51) Int. Cl.
*G01L 9/12* (2006.01)
*H01G 5/16* (2006.01)
*G01P 15/125* (2006.01)

(52) U.S. Cl.
CPC ............... *H01G 5/16* (2013.01); *G01P 15/125* (2013.01)
USPC .......................................... 73/724; 361/283.4

(58) Field of Classification Search
CPC .................................. G01P 15/125; G01L 9/12
USPC .......... 73/718, 724, 514.32; 361/283.1, 283.4
See application file for complete search history.

(56) References Cited

U.S. PATENT DOCUMENTS

| | | | | |
|---|---|---|---|---|
| 5,025,346 | A * | 6/1991 | Tang et al. | 361/283.1 |
| 6,571,628 | B1 * | 6/2003 | Miao et al. | 73/488 |
| 7,600,428 | B2 * | 10/2009 | Robert et al. | 73/514.32 |
| 7,900,518 | B2 * | 3/2011 | Tai et al. | 73/754 |
| 2006/0082543 | A1 | 4/2006 | Van Lydegraf et al. | |

FOREIGN PATENT DOCUMENTS

| | | |
|---|---|---|
| WO | WO 95/06236 | 3/1995 |
| WO | WO 96/17430 | 6/1996 |

OTHER PUBLICATIONS

First Office Action of related CN Patent App. No. 201280017925.6, issued Aug. 26, 2014, with English translation, 22 pages.

* cited by examiner

*Primary Examiner* — John Chapman, Jr.
(74) *Attorney, Agent, or Firm* — Brinks Gilson & Lione; John C. Bacoch

(57) ABSTRACT

A micro electro mechanical system device has a first subassembly having sensor element including a coupler, and a second subassembly including a comb drive. The comb drive having stator plates and rotor plates and the coupler configured to displace the rotor plates relative to the stator plates providing a variable capacitance dependent on the displacement of the rotor plate.

22 Claims, 14 Drawing Sheets

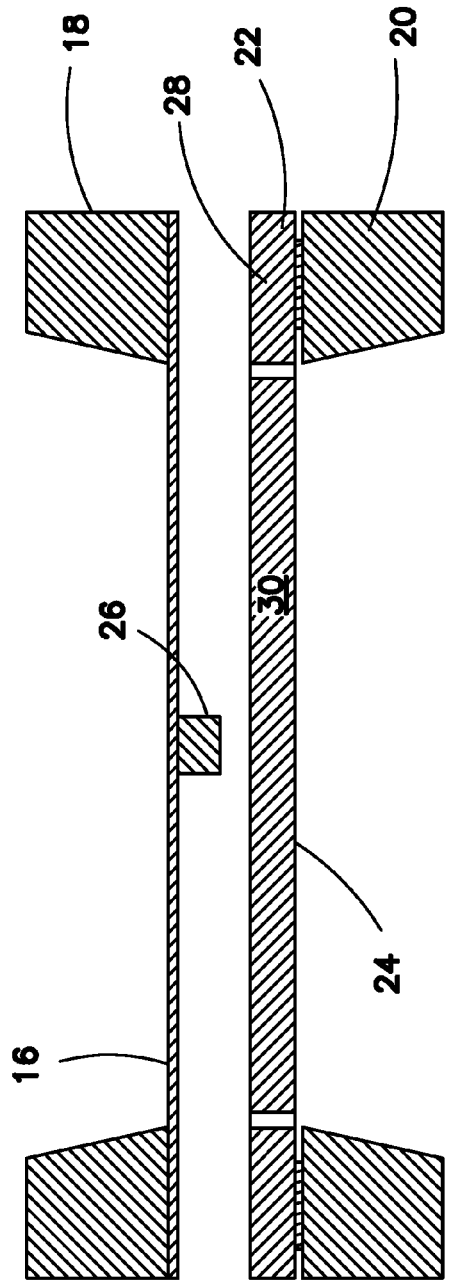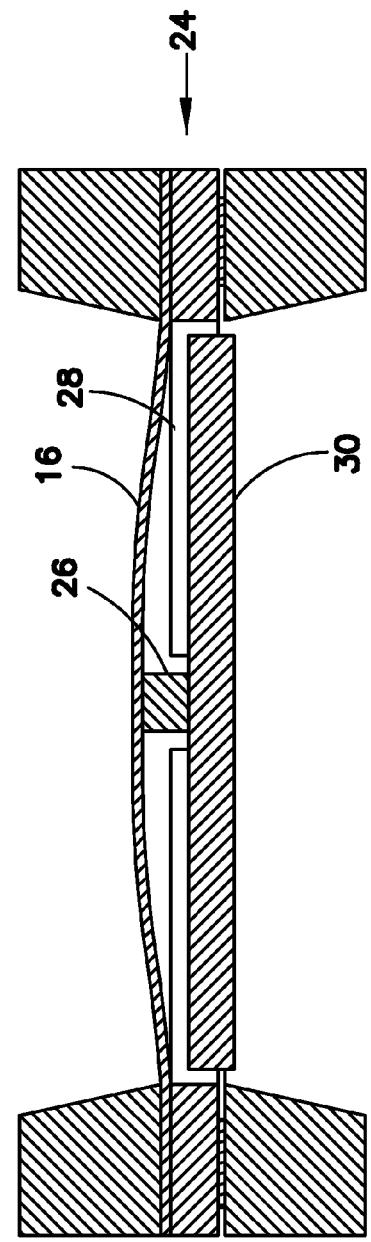

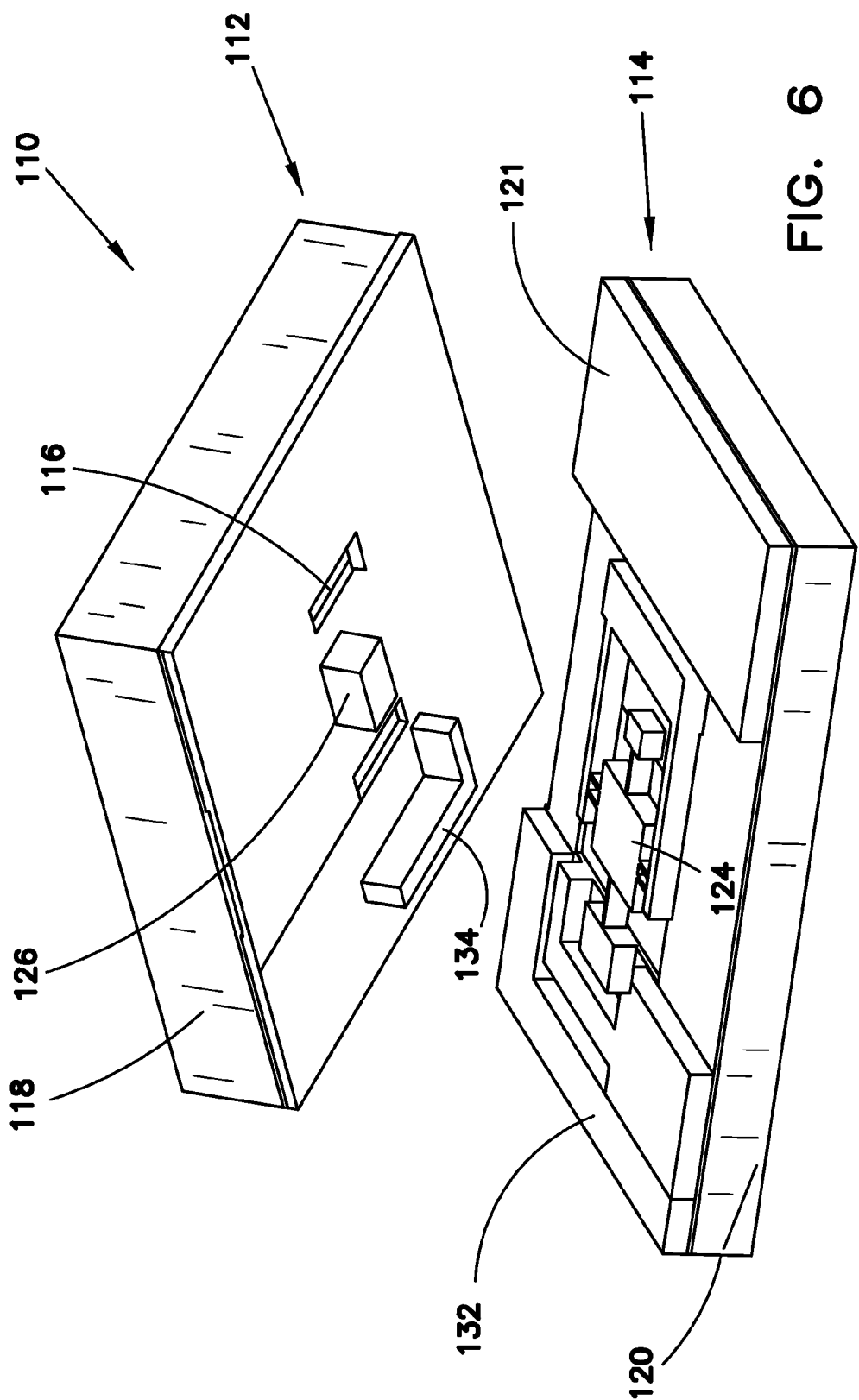

MEMS DEVICES EXHIBITING LINEAR CHARACTERISTICS

REFERENCE TO EARLIER FILED APPLICATIONS

This application claims the benefit under 35 U.S.C. §119 (e) of U.S. Provisional Application No. 61/441,760, filed Feb. 11, 2011, the disclosures of which is incorporated, in its entirety, by this reference.

FEDERALLY SPONSORED RESEARCH

This invention was made with government support under Grant Number CNS0941497 awarded by the National Science Foundation. The government has certain rights in the invention.

The present application relates to the field of micro electro mechanical system sensors.

BACKGROUND

This disclosure relates to apparatus and methods for improving the precision of capacitive nanoscale measurements of pressure and other physical variables using micro electro mechanical systems, commonly referred to as MEMS. A particular focus is in developing features affording linear performance characteristics of such devices, which may be further varied by application of electrostatic, thermal, or physical displacement biasing. Another focus is in developing novel structural component elements designed to simplify the manufacture of MEMS devices having the desired features.

The use of MEMS devices for measurement of pressure and other physical variables is known, for example, from U.S. Pat. No. 7,721,587 and the prior art references cited therein. It is well known to researchers in the area of micro and nano-electromechanical systems (M/NEMS) that mechanical performance strongly depends on geometric and material properties. These fabricated properties are difficult to predict and difficult to measure. The problem with prediction is that, given any fabrication recipe, the geometric and material properties of the devices that result from that recipe will vary between fabrication facilities, between fabrication runs, and even across a given wafer itself. A problem with many measurement methods is that they often yield uncertainties that are of the same order as the property being measured.

Regarding material properties, for a given displacement, Young's modulus is often used to determine force in MEMS by Hooke's law. However, the Young's modulus of fabricated MEMS devices is often unknown. Although many in the field use lookup tables to determine the Young's modulus, such values are usually averages of measurements that vary by 10 percent or more. Since there is currently no standard for measuring Young's moduli, the true accuracy of such measurements is unknown. It has been shown that standard overetch errors in fabrication can increase system stiffness as high as 98%. Including the uncertainty in Young's modulus increases the relative error in stiffness to 188%. Thus, there remains a need for MEMS measurement devices that can be reliably calibrated and operate on a linear slope to simplify the calibration and scaling of the movement of the MEMS device in relation to the variable sought to be measured.

SUMMARY

An embodiment includes a microfabricated variable capacitor comprising a stator and a rotor. The stator includes a plurality of electrically conductive plates each spaced apart from one another and each pair of adjacent plates form a channel therebetween. Each of the plates is in a first common electrical communication. The rotor includes a central hub and first and second arms extending in cantilever manner from opposite sides of the hub. A first plurality of electrically conductive blades is coupled to the first arm and a second plurality of electrically conductive blades is coupled to the second arm. Each of the first plurality and the second plurality of blades are in a second common electrical communication. The hub is suspended from the stator by first and second springs, such that each of the blades is received within a corresponding channel and a portion of each blade coacts with an adjacent said plate to store and electrical charge, and the capacitance between the first electrical communication and the second electrical communication varies as the first and second springs bias the rotor to different positions relative to said stator.

Another embodiment includes a microfabricated variable capacitor comprising a stator, a rotor, and a suspension system. The stator has a width and includes a plurality of electrically conductive plates each spaced apart from one another with each plate having a top, a bottom, and a midsection therebetween. Adjacent plates form a channel between opposing midsections and each of the plates is in a first common electrical communication. The rotor has a length and includes a plurality of electrically conductive blades with each blade having a top, a bottom, and a midsection therebetween. The rotor is suspended relative to the stator such that each of the blades is received within a corresponding channel and the midsection of each said blade includes an area that overlaps with an area of an adjacent plate. Each of the blades being in a second common electrical communication. The suspension system flexibly couples the rotor relative to said stator. The system flexibly couples to the stator at a location about midway across the width and to the rotor at a location about midway along the length. The capacitance between the first electrical communication and the second electrical communication varies in correspondence to different overlapping areas.

Other embodiments include a micro electro mechanical system sensor. The micro electro mechanical system sensor comprises a comb drive and a membrane suspended proximate the cone drive. The cone drive has a stator portion with a plurality of stator plates each spaced apart from one another and a rotor portion including a plurality of rotor plates spaced apart from one another. The rotor portion is elastically suspended from the stator portion and the plurality of stator plates and the plurality of rotor plates form a capacitor having a capacitance that varies with the position of the rotor portion relative to the stator portion. The membrane suspended proximate the comb drive has a stub in physical contact with the rotor portion of the comb drive that biases the rotor portion to a first position having a first comb drive capacitance and a movement of the membrane causes the stub to bias the rotor portion to a second position having a second comb capacitance.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which:

FIG. 3a is a schematic sectional view of the two sub-assemblies shown in FIG. 1 spaced apart.

FIG. 3b is a schematic sectional view of the two sub-assemblies shown in FIG. 1 assembled together causing a physical displacement of one element of the comb drive.

FIG. 6 is a schematic orthogonal view of a MEMS device including a trench and dimple alignment feature.

The drawings are not necessarily to scale.

DETAILED DESCRIPTION

Figure 1:
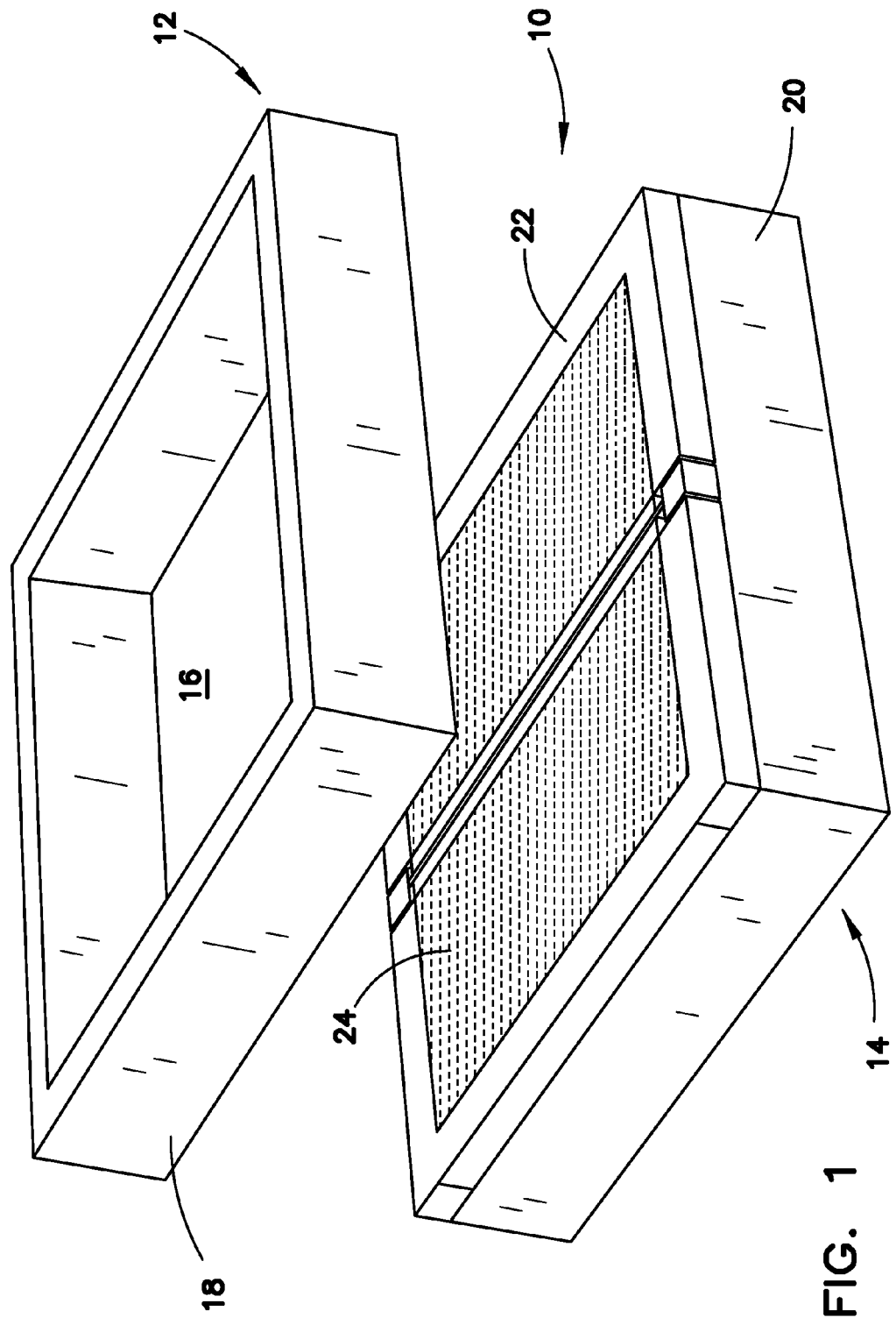
FIG. 1 is a schematic orthogonal view of the upper surfaces of two sub-assemblies designed to form an embodiment of a MEMS device.
Figure 2:
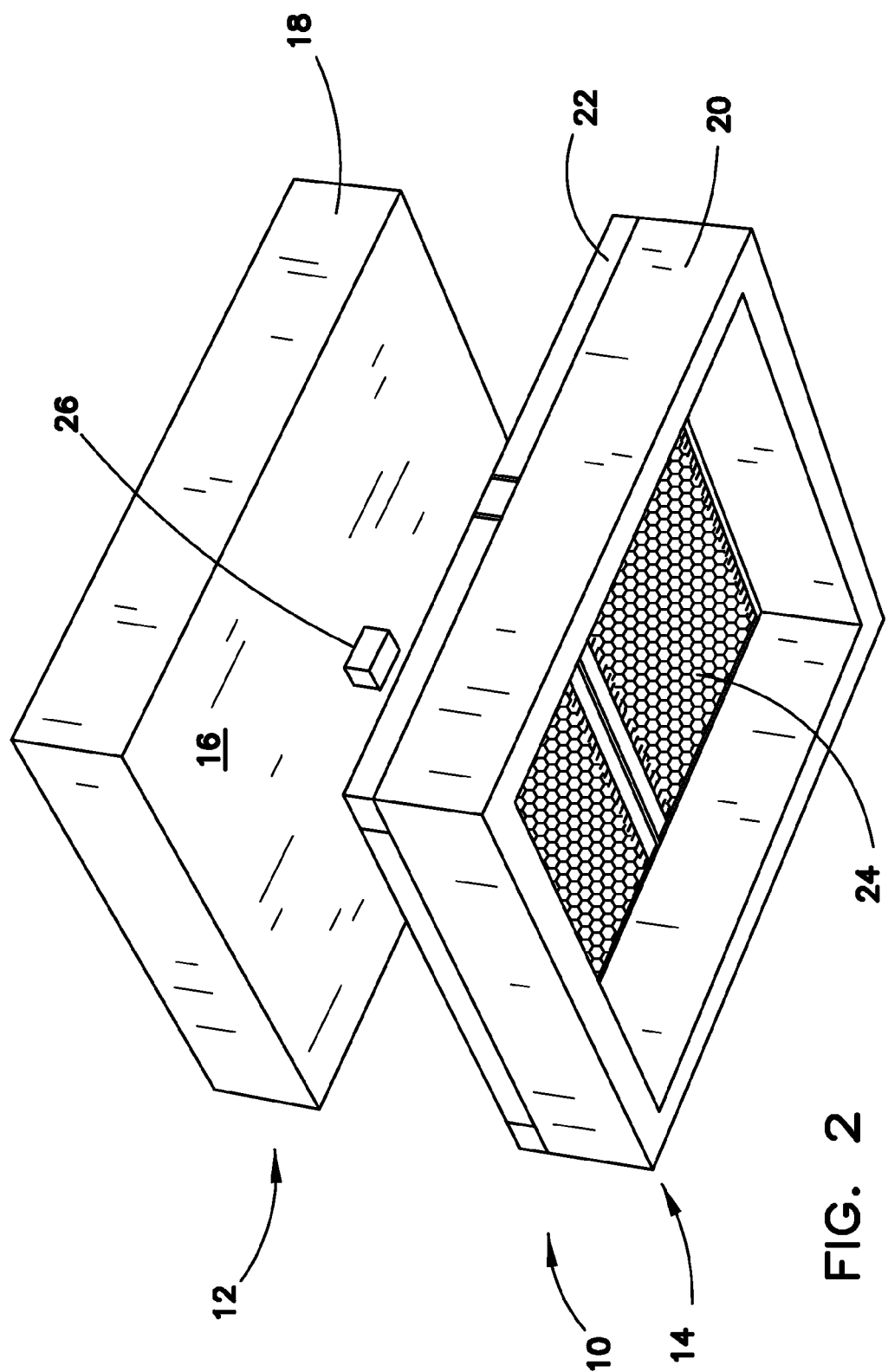
FIG. 2 is a schematic orthogonal view of the lower surfaces of the two sub-assemblies shown in FIG. 1.

A MEMS sensor device 10 is shown in FIG. 1 in an exploded view to include two sub-assemblies 12 and 14. An upper or membrane sub-assembly 12 includes a $SiO_2$ membrane 16, which may have a thickness of about 2 μm. A much thicker upper handle layer 18 surrounds the perimeter of the $SiO_2$ membrane 16. The upper handle layer 18 may be formed of single crystal silicon (SCS) and may have a thickness of about 400 μm in a vertical dimension. The lower or comb drive sub-assembly 14 includes a lower handle layer 20, which may also be formed of SCS and be of similar dimension as the upper handle layer 18. An outside perimeter of a conductive SCS layer 22 is supported on the lower handle layer 20. The conductive SCS layer 22 is etched or otherwise fabricated by conventional silicon-on-insulator (SOI) technology to form a comb drive 24. The comb drive 24 is comprised of a stator having stator plates and a rotor having rotor plates (see FIG. 4). A lower view of the MEMS sensor device 10 is shown in FIG. 2 to reveal a stub 26 situated at a central location of the membrane 16 and extending toward the comb drive 24.

FIG. 3a and FIG. 3b are sectional views of the sub-assemblies 12, 14 of the embodiment of FIG. 1. FIG. 3a shows the two sub-assemblies 12, 14 apart, while FIG. 3b shows the two sub-assemblies 12, 14 joined. The effect of the joining of the two sub-assemblies 12, 14 can be seen by comparing FIGS. 3a and 3b. In both FIGS. 3a and 3b, the section is taken through a rotor plate parallel to the stator plates. In FIG. 3A a stator portion 28 of the comb drive 24 is visible in the region of the lower handle layer 20 supporting the comb drive 24 while a movable rotor portion 30 of the comb drive 24 is visible above the lower opening provided by the handle layer 20. As shown in FIG. 3B, when the two sub-assemblies 12 and 14 are joined, the stub 26 on membrane 16 contacts the movable rotor portion 30 of the comb drive 24 causing a downward displacement of the rotor portion 30 in relation to the stator portion 28. The two sub-assemblies 12 and 14 are retained together by a $SiO_2$ junction around the perimeter of the two sub-assemblies. When joined, the resistance to displacement provided by the flexure of supporting portions (not shown) of the rotor portion 30 can at least partially offset the downward force provided by the stub 26 and supporting membrane 16 so that the supporting membrane 16 can become upwardly bowed as shown.

Figure 4:
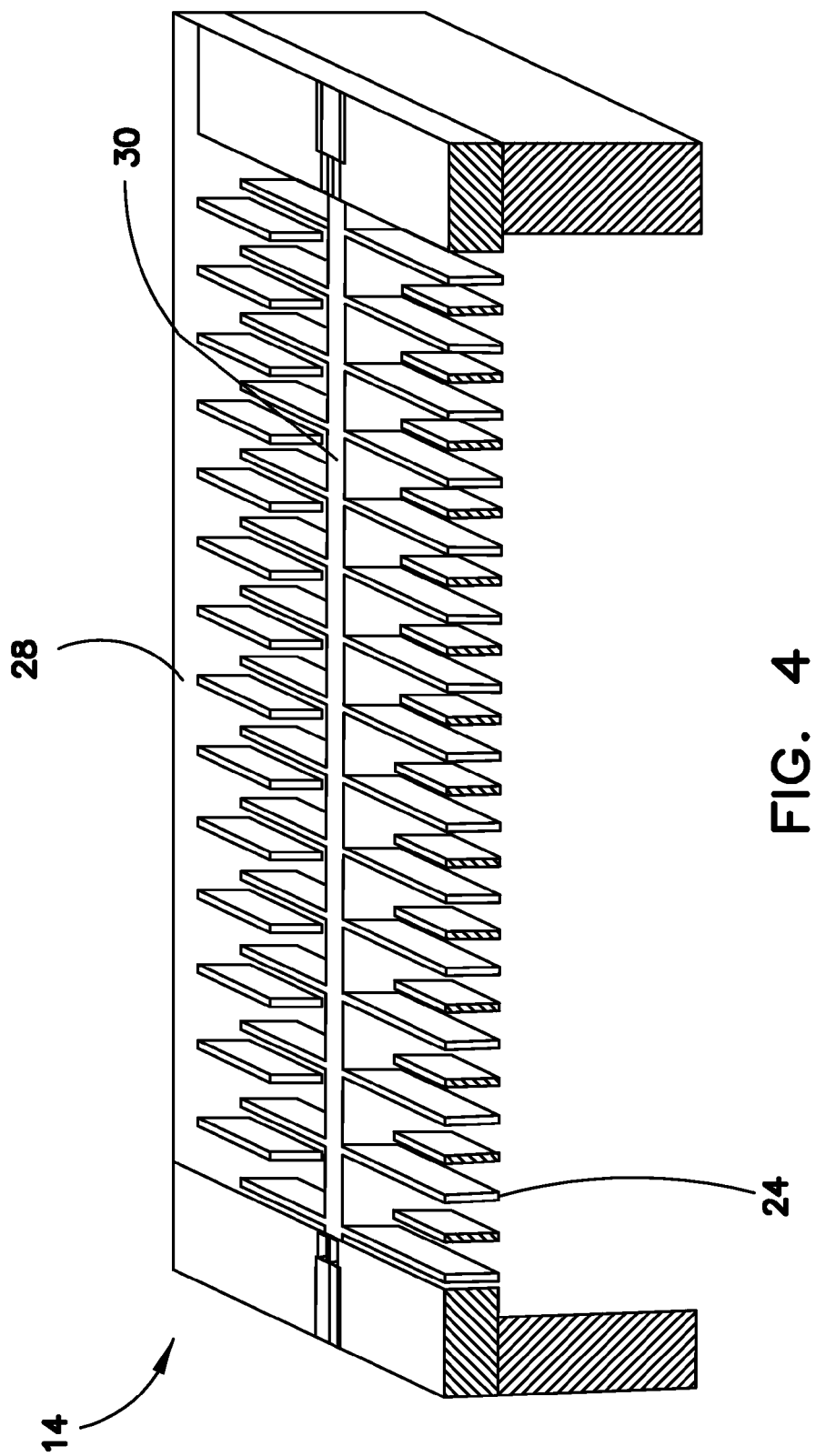
FIG. 4 is a schematic orthogonal sectional view of the comb drive sub-assembly identifying a region of interest.
Figure 5:
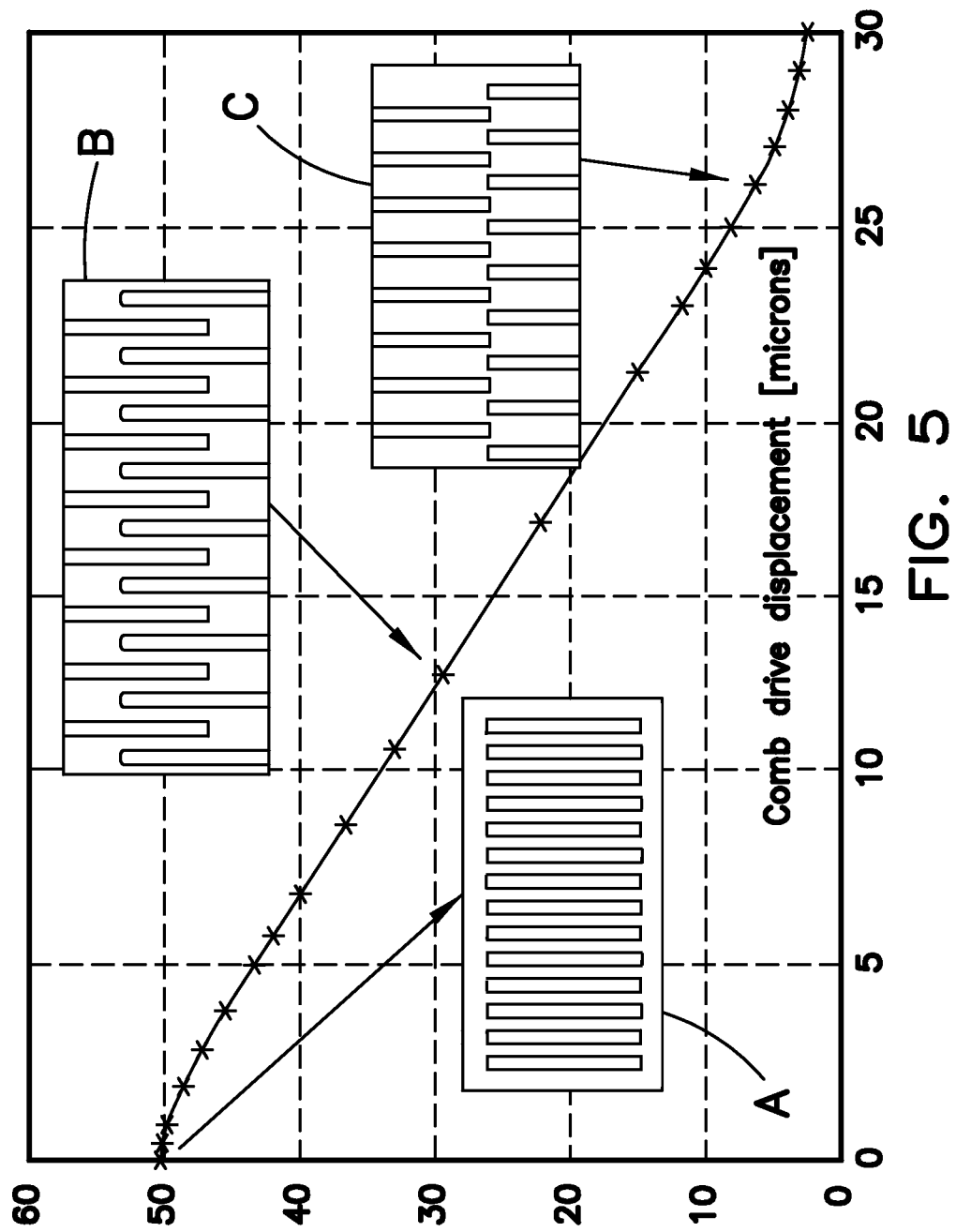
FIG. 5 is a graph of the capacitance of the comb drive in relation to the relative displacement of the elements of the comb drive.

FIG. 4 is a schematic orthogonal sectional view of the comb drive sub-assembly 14, the section being taken perpendicularly to the sectional view provided by FIGS. 3a and 3b through both the stator portions 28 and rotor portions 30. Upon assembly of the two sub-assemblies 12 and 14, the rotor portions 30 are displaced downward relative to the stator portions 28. Further displacement of the rotor portions 30 relative to the stator portions 28 can occur as a result of a displacement of the membrane 16 due to gas pressure or other forces. The displacement of the rotor portions 30, which can result from the displacement of the membrane 16, can cover a range of distances shown in three images on the graph shown in FIG. 5. As the rotor portion 30 and stator portion 28 are initially formed, they appear as in image A in FIG. 5. When the rotor portion 30 and stator portion 28 are displaced relative to each other they appear, more or less, as shown in image B in FIG. 5. As the rotor portion 30 and stator portion 28 become fully displaced relative to each other they may achieve a relative position as shown in image C in FIG. 5. The graph in FIG. 5 shows the capacitance, measured in picofarads, of the parallel plates forming the comb drive 24 in the various positions of relative displacement. The greatest capacitance is, of course, exhibited when the parallel plates of the comb drive 24 have their maximum confronting area to each other as in image A, while the least capacitance is exhibited when the parallel plates of the comb drive 24 have a minimum confronting area to each other as in image C. It is important to note that over a significant range of relative displacement, the change in capacitance is linearly related to the extent of relative displacement. A MEMS sensor device 10 of the present disclosure uses the stub 26 on membrane 16 dimensioned to cause an initial displacement of the rotor portions 30 relative to the stator portions 28. The dimension is selected such that any further relative displacement of the two portions of the comb drive is in the linear portion of the capacitance/displacement curve.

Figure 7A:
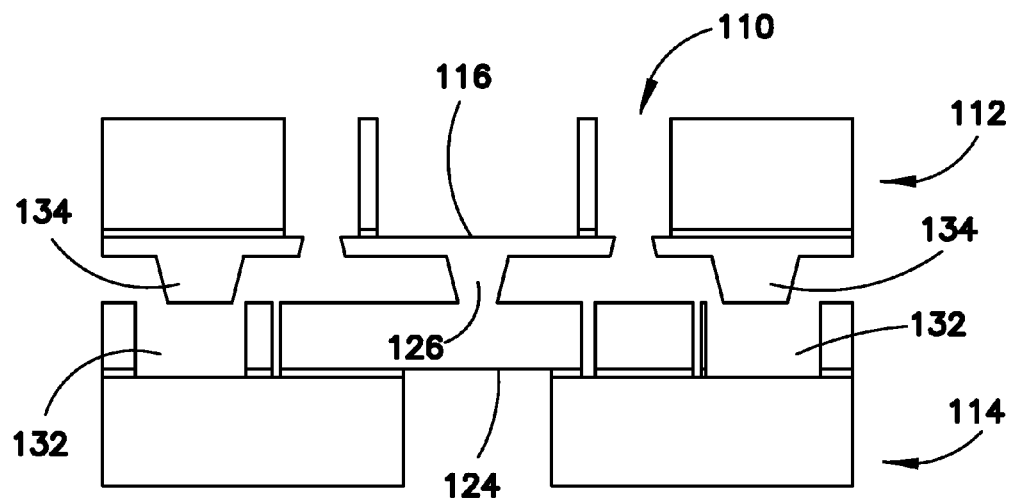
FIG. 7a is a schematic sectional view similar to FIG. 3a of the device shown in FIG. 6.
Figure 7B:
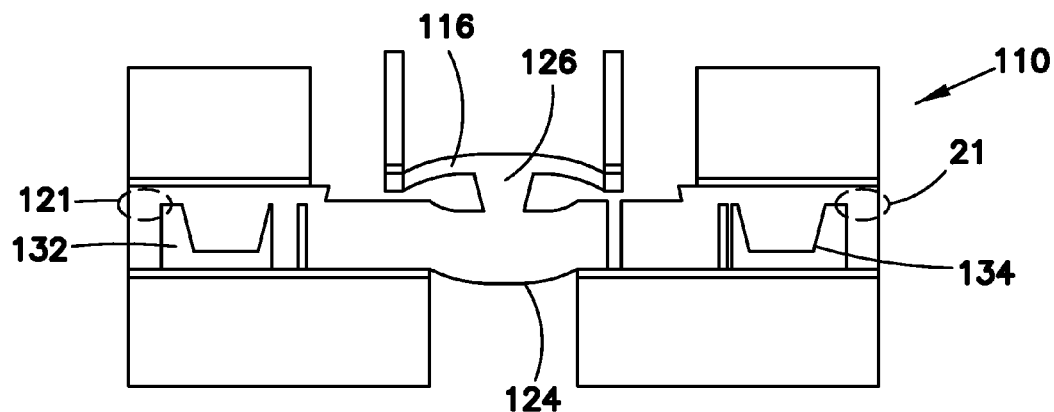
FIG. 7b is a schematic sectional view similar to FIG. 3b of the device shown in FIG. 6.

FIG. 6 is a schematic orthogonal view of a MEMS device 110 having features similar to the device 10 shown in FIGS. 1-4, and including an alignment feature that ensures correct assembly of the device 110. The MEMS device 110 shown in FIG. 6 includes membrane sub-assembly 112 having a membrane 116, with a stub 126 centrally position on the lower surface of the membrane 116, surrounded by a much thicker upper handle layer 118. The comb drive sub-assembly 114 includes a lower handle layer 120 in the same general manner as shown in FIGS. 1-4. The perimeter portion of the two sub-assemblies 112 and 114 provide a bonding area 21 to physically secure the two sub-assemblies 112 and 114 to each other. An alignment feature comprises at least one trench or ditch 132 provided in the perimeter bonding area of one of the sub-assemblies 112 and 114. A corresponding dimple or post feature 134 is provided in the perimeter bonding area of the other one of the sub-assemblies 112 and 114. The trench 132 and dimple 134 can each include a shape characteristic so as to provide a unique alignment relation between the two sub-assemblies 112 and 114. Additionally, the vertical dimension of the trenches 132 and dimples 134 can be sufficient to provide a tactile sensory input to an assembler assuring correct relative alignment of the two sub-assemblies 112 and 114. FIGS. 7a and 7b are schematic sectional views similar to FIG. 3a and FIG. 3b, respectively of the MEMS device 110 shown in FIG. 6 during assembly.

Figure 8:
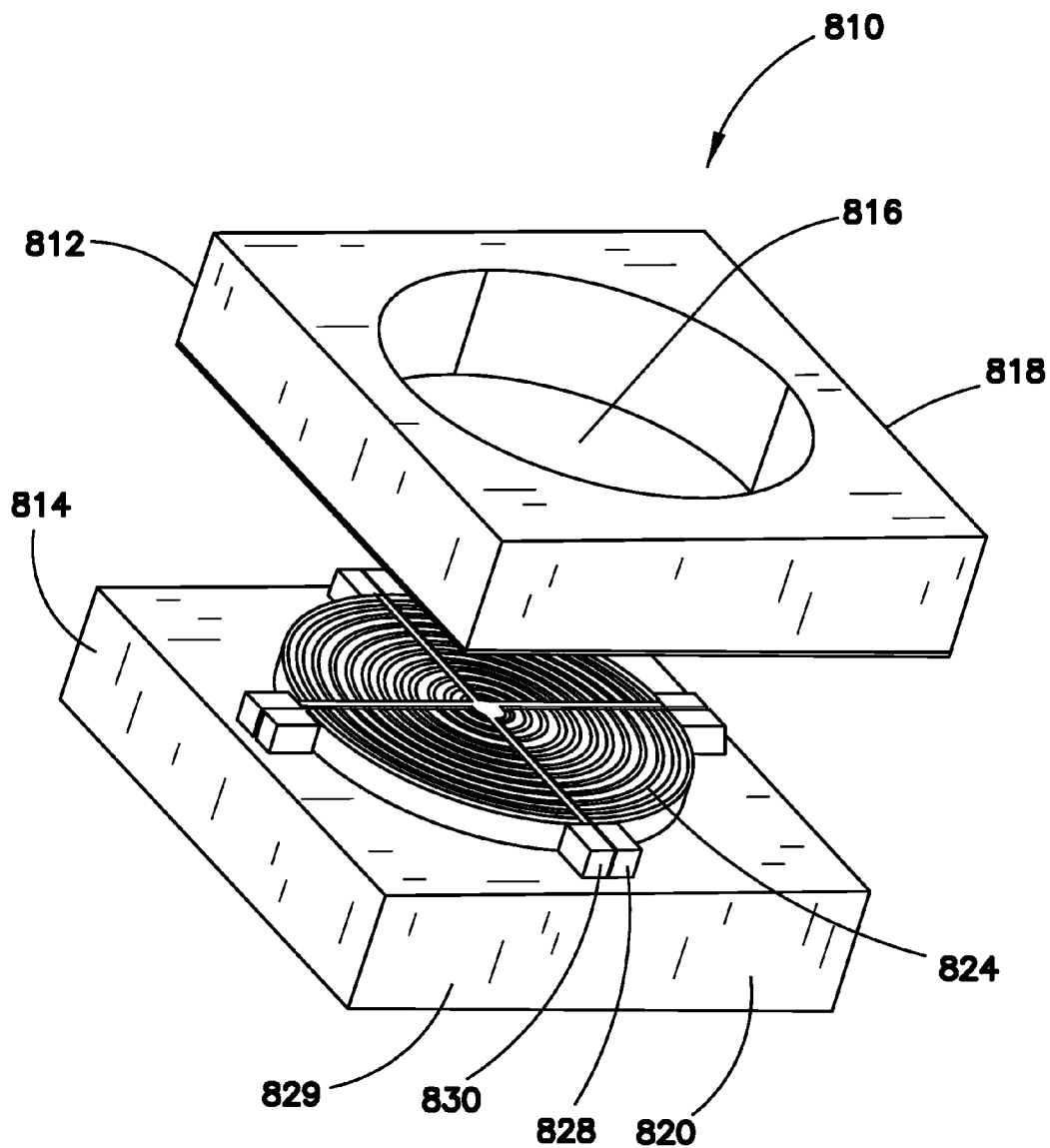
FIG. 8 is schematic orthogonal view similar to FIG. 1 of the upper surfaces of two sub-assemblies designed to form another embodiment of a MEMS device.
Figure 9:
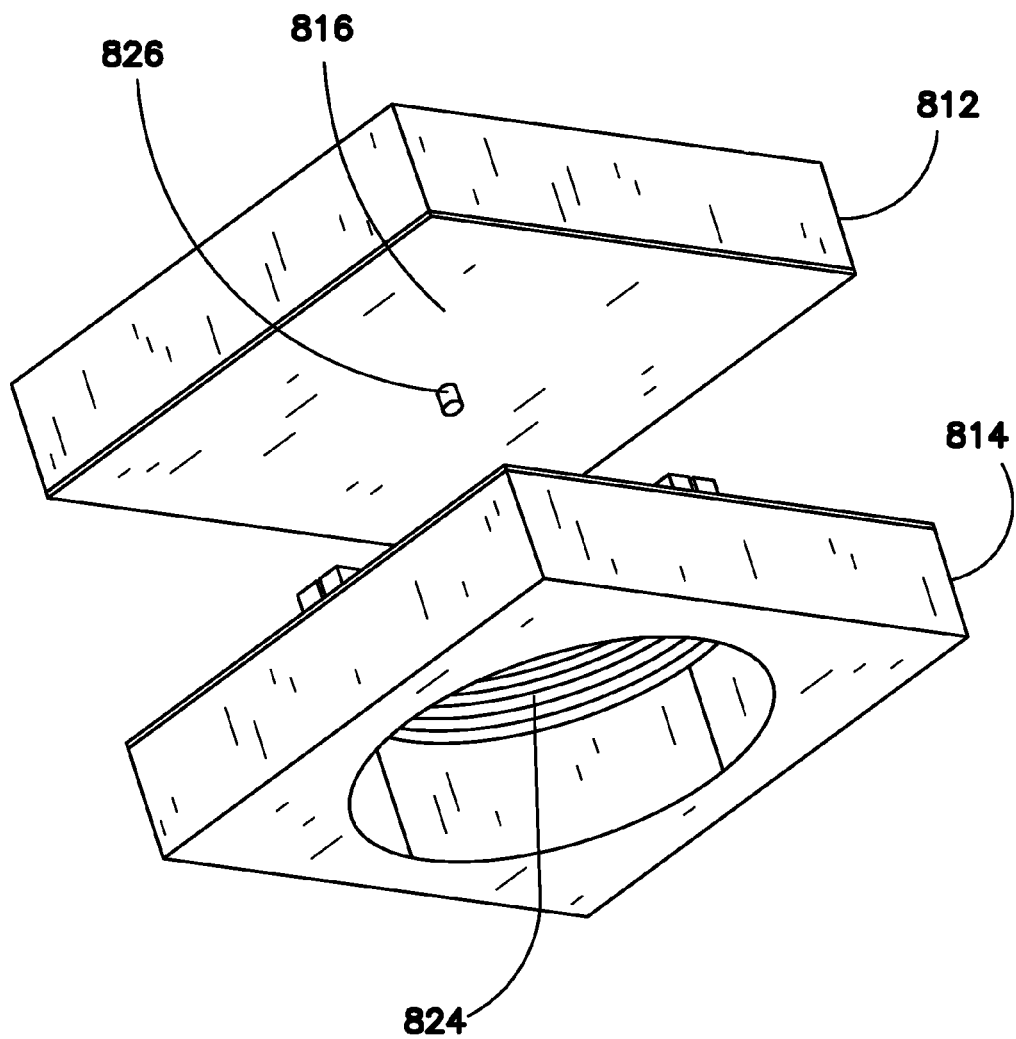
FIG. 9 is schematic orthogonal view similar to FIG. 2 of the lower surfaces of two sub-assemblies shown in FIG. 8.
Figure 10:
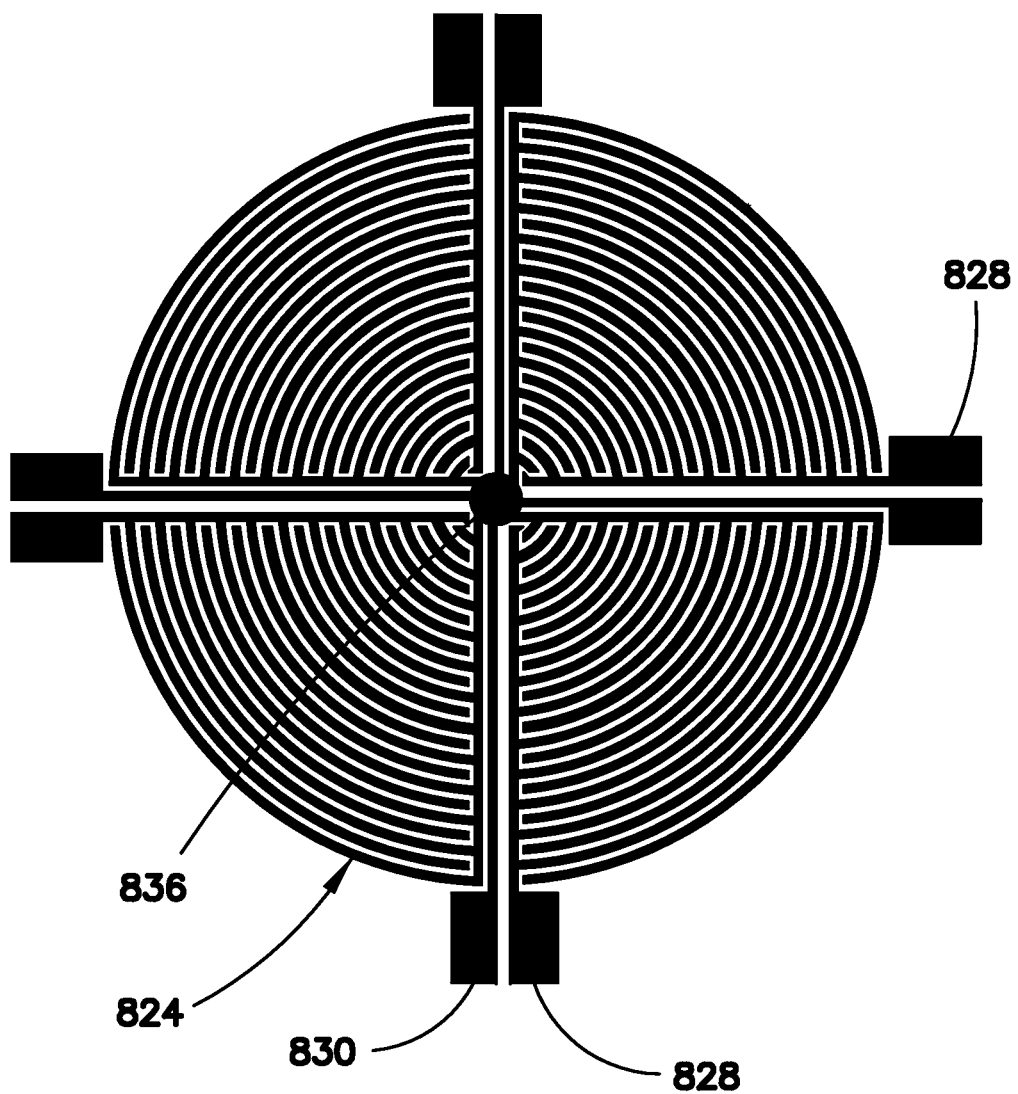
FIG. 10 is a plan view of a circular comb drive included in the second embodiment MEMS device.

An alternative embodiment of a MEMS device 810 shown in FIGS. 8-10 includes a membrane sub-assembly 812 having a membrane 816, with a stub 826 centrally positioned on the lower surface of the membrane 816, surrounded by a much thicker upper handle layer 818. A comb drive sub-assembly 814 includes a lower handle layer 820. The perimeter portion of the two sub-assemblies 812 and 814 provide a bonding area to physically secure the sub-assemblies to each other. A comb drive 824 includes a stator portion 828 and a movable rotor portion 830, both of which are confined within a generally circular perimeter formed by the perimeter portion of the comb drive 824. Plates forming the two portions of the comb drive 824 are shown in plan view in FIG. 10. The plates comprise arcuate elements positioned at spaced distances from a centrally located hub at a common center 836, which is also the contact point of the stub 826. One end of each of the arcuate elements of the rotor portion 830 is coupled to a radially extending portion of the rotor portion 830 cantileverly supported from the centrally located hub. One end of each of the arcuate elements of the stator portion 828 of the comb drive 824 is coupled to a radially extending portion of the stator portion 830. The circular comb drive configuration shown in FIGS. 8-10 is resistant to in-plane translation and insensitive to incidental comb drive rotation during assembly.

Figure 11:
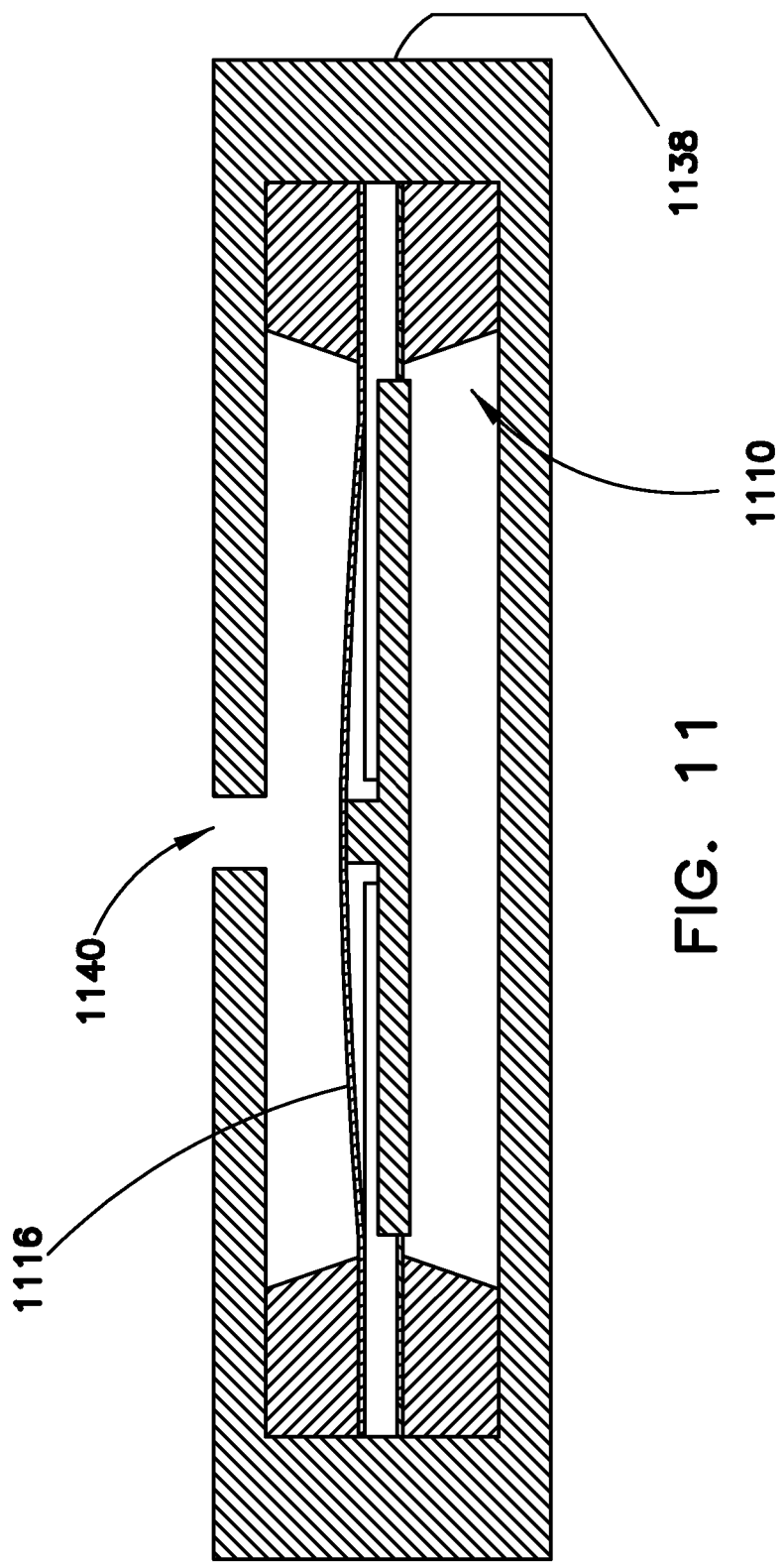
FIG. 11 is a schematic sectional view of a MEMS device included in packaging defining a gas pressure port confronting the MEMS membrane.

FIG. 11 is a schematic sectional view of a MEMS device 1110, which can be of any of the previously illustrated embodiments, included in packaging 1138 defining a gas pressure port 1140 opposing a MEMS membrane 1116. Although shown opposing the MEMS membrane 116, the port 1140 need not oppose the MEMS membrane 116 in all embodiments. The packaging 1138 preferably defines a fluid impervious environment for the MEMS device 1110, except for the port 1140. The material characteristics of the packaging 1138 can be chosen based on the expected environment for the device 1110.

Figure 12:
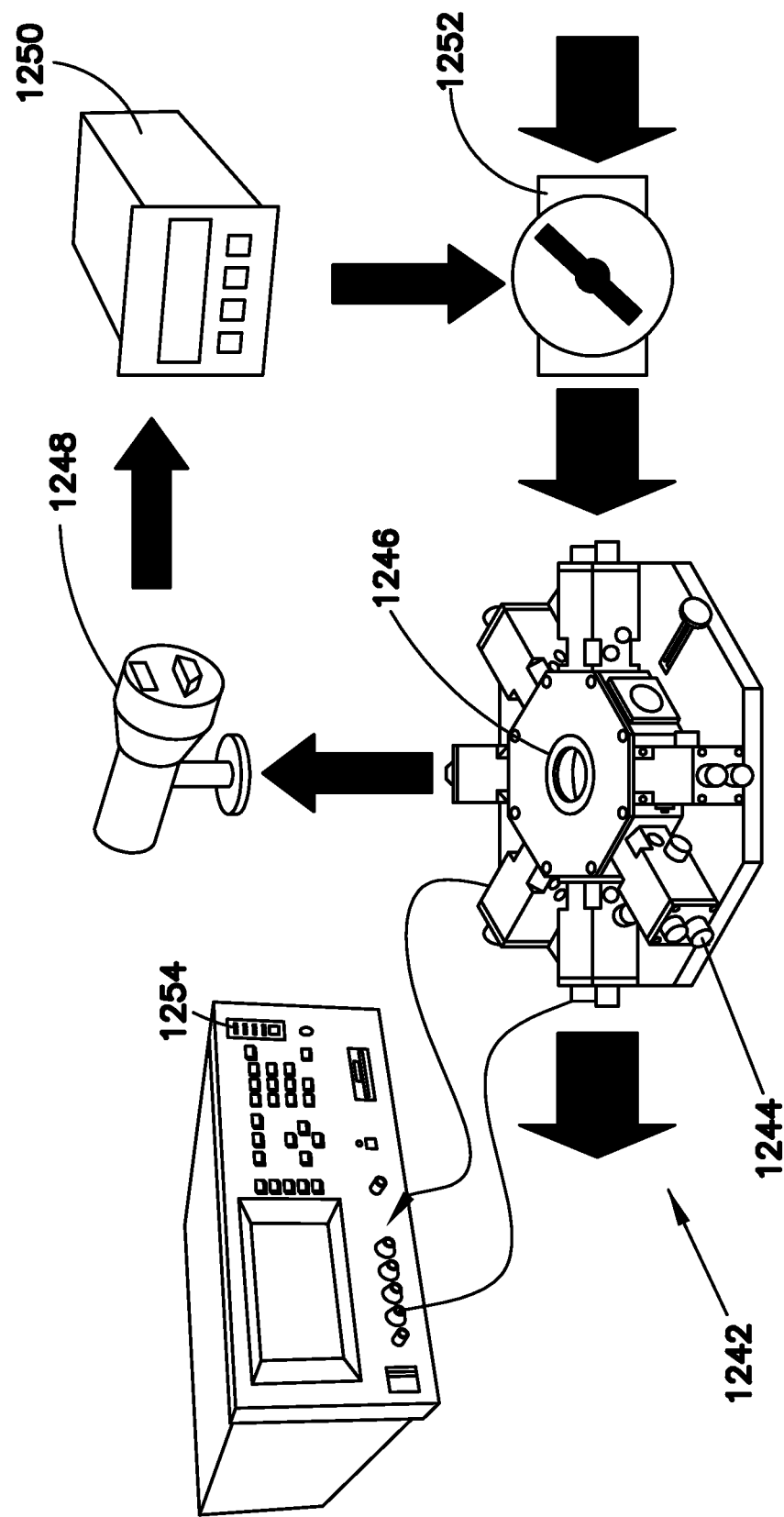
FIG. 12 is an experimental assembly for evaluating the performance of the MEMS devices in relation to gas pressure.

FIG. 12 illustrates in block form an experimental assembly 1242 for evaluating the performance of a MEMS device, such as MEMS device 10 of FIG. 1, in relation to gas pressure. The experimental assembly 1242 includes a micro probe station 1244 designed to receive the MEMS device in a controlled environmental chamber 1246. The environmental chamber 1246 can be coupled to a vacuum pump, not shown, for reducing the gas pressure experienced by the MEMS device. A pressure sensor 1248 can be coupled to the environmental chamber 1246 to measure the pressure within the environmental chamber 1246. An output of the pressure sensor 1248 can be coupled to a pressure controller 1250, which is in turn coupled to a gas flow/pressure regulator 1252. The gas flow/pressure regulator 1252 can be coupled to a source of gas, such as a nitrogen container, not shown. The gas flow/pressure regulator 1252 can, in response to signals provided by the pressure controller 1250, admit a flow of a desired gas to exert pressure on the membrane of the MEMS device being evaluated within the controlled environmental chamber 1246. The mechanical performance determined from the measured electrical characteristics of the MEMS device 1210 can be tracked by suitable metering equipment 1254, such as an HP™ model 4284 LCR meter.

In one example of the Electro Micro-Metrology method, width can be measured in terms of changes in capacitance, $w(\Delta C)$; and the uncertainty in width can be measured by multiplying the uncertainty in capacitance by the sensitivity in width to capacitance, $\partial C \times (\partial w/\partial \Delta C)$. While the sensitivity is typically large, $\sim 10^8$ m/F, the uncertainty in capacitance is $\sim 10^{-18}$ F or smaller. Hence, the uncertainty in width is on the order of an angstrom.

A comb drive microstructure can be fabricated to intentionally include two unequal gap-stops, $gap_1$ and $gap_2$. The two intentionally unequal gaps provide a structure that allows one to eliminate from consideration unknown geometric and material properties. By measuring the change in capacitance required to close the two gaps with an applied voltage, one can obtain the structure's geometry, electrostatic force, and system stiffness as follows. The measured change in capacitance required to traverse each gap, $\Delta C_1$, and $\Delta C_2$, may be respectively expressed as: $\Delta C_1 = 2N\beta\epsilon h \; gap_1/g = 2N\beta\epsilon h (gap_{1,layout}+\Delta gap)/g$, and $\Delta C_2 = 2N\beta\epsilon h \; gap_2/g = 2N\beta\epsilon h (gap_{2,layout}+\Delta gap)/g$, where N is the number of comb fingers in the comb drive microstructure, $\epsilon$ is the unknown permittivity of the medium, h is the unknown layer thickness of the microstructure, g is the unknown gap distance between comb fingers, $\beta$ is the unknown electrostatic fringing field factor, and $\Delta gap$ is the unknown difference in gap-stop size between the intended design layout and actual fabrication. A layout parameter n is chosen such that $gap_{1,layout} \neq gap_{2,layout} = n \; gap_{1,layout}$. Taking the ratio $\Delta C_1/\Delta C_2$ of the above expressions yields $\Delta gap = gap_{1,layout}(n \; \Delta C_1/\Delta C_2 - 1)/(\Delta C_1/\Delta C_2 - 1)$. For isotropic fabrication processes within close proximity, $\Delta gap$ is locally consistent and provides a measure for all planar geometries of the structure. That is, fabricated gaps are $gap_{layout}+\Delta gap$, flexure widths are $width_{layout}-\Delta gap$, flexure lengths are $length+\Delta gap$, etc.

Another unique attribute of the Electro Micro-Metrology method is the ability to directly quantify the uncertainty of measurement. The uncertainties in the measured capacitance $\partial C$ and voltage $\partial V$, i.e. order of readout resolution due to an accumulation of noise sources, yield corresponding uncertainties in mechanical properties. That is, by replacing all instances of capacitance and voltage with $\Delta C \pm \partial C$ and $\partial V \pm \partial V$ in the above expressions, multivariate Taylor expansions about the electrical uncertainties yield mechanical uncertainties as the first order terms of the form $x_i(\Delta C)\partial C$ for uncertainty in displacement, $F_1(\Delta C, V)\partial C \pm F_2(\Delta C, V)\partial V$ for the uncertainty in force, and $K_1(\Delta C, V)\partial C \pm K_2(\Delta C, V)\partial V$ for uncertainty in stiffness.

Additionally, the Electro Micro-Metrology method can also be used to effectively select the system stiffness for a MEMS device to be a particular amount of N/m. The change in capacitance can be used to measure the fabricated geometry, the comb drive force, mechanical stiffness, and displacement. Specifically, the Electro Micro-Metrology comb drive force is given by $F_E = \frac{1}{2}\Psi V^2$, the stiffness is given by $KM = \frac{1}{2}\Psi^2 V^2/\Delta C$, and the displacement $x = \Delta C/\Psi$, where $\Psi = \Delta C_{gap}/gap$, which is the comb drive constant.

Figure 13:
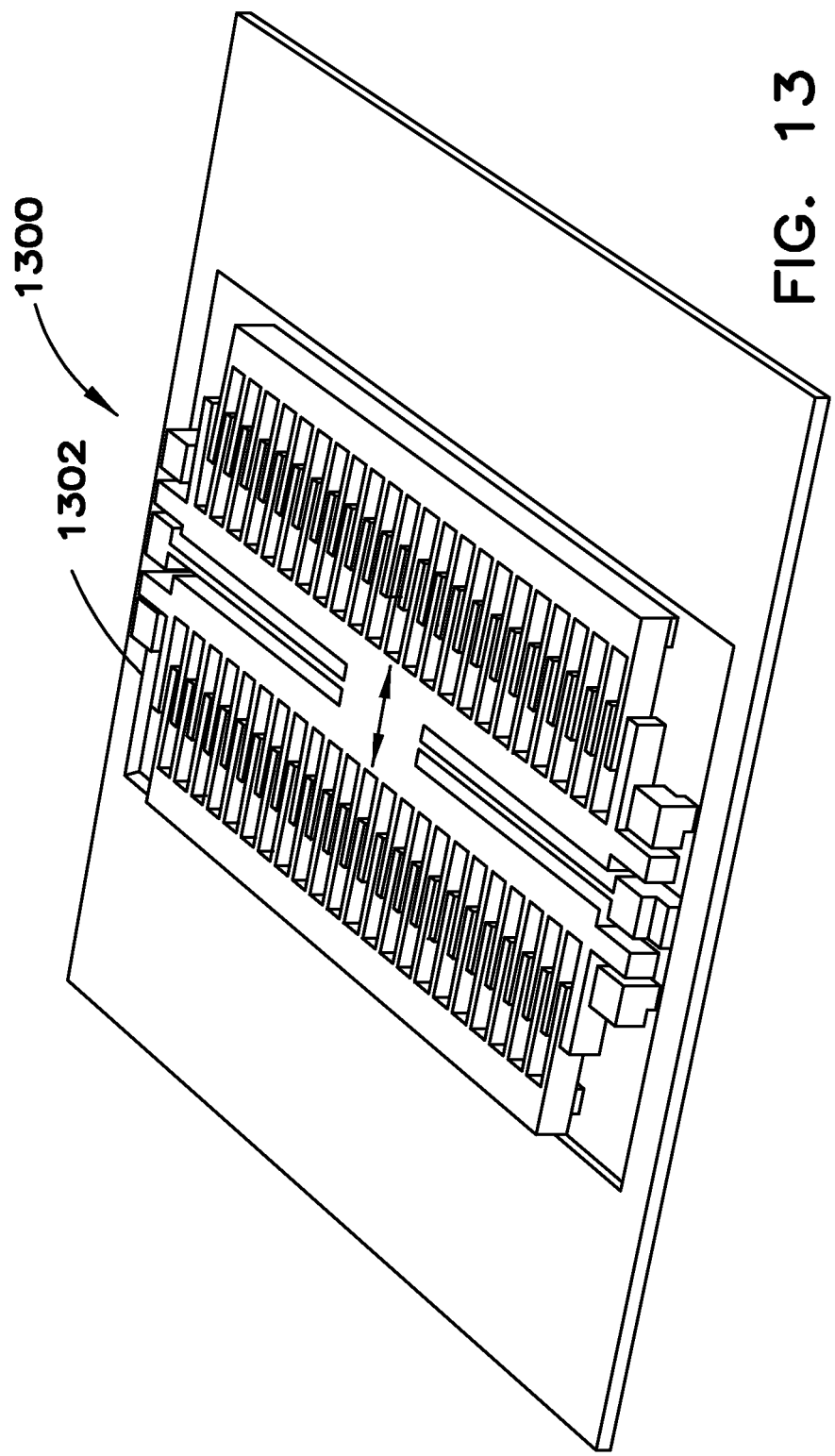
FIG. 13 is a thermal sensor self-calibrated using Electro Micro-Metrology methods.

The Electro Micro-Metrology method can be used for an autonomous self-calibrated temperature sensor 1300 having a linear response curve. In this application, changes in electrical capacitance are used to sense thermally-induced vibrations or static deformations. A resonator 1302 shown in FIG. 13 can incorporate a fixed-fixed active or passive resonator 1302 for measuring planar oscillation frequencies. The fixed-fixed oscillator experiences a change in resonance frequency due to thermal expansion. The change in resonance frequency is significant due to the fixed-fixed configuration. After system mass and stiffness are determined by the Electro Micro-Metrology method, measurement of resonant frequency is used to determine temperature by the change in stiffness due to thermal expansion of the fixed-fixed oscillator. This resonator 1302 may be driven actively by applying a suitable oscillating voltage for large displacement amplitudes, or the resonator 1302 may be driven passively due to thermally-induced vibrations at the expense of much smaller amplitudes.

Figure 14:
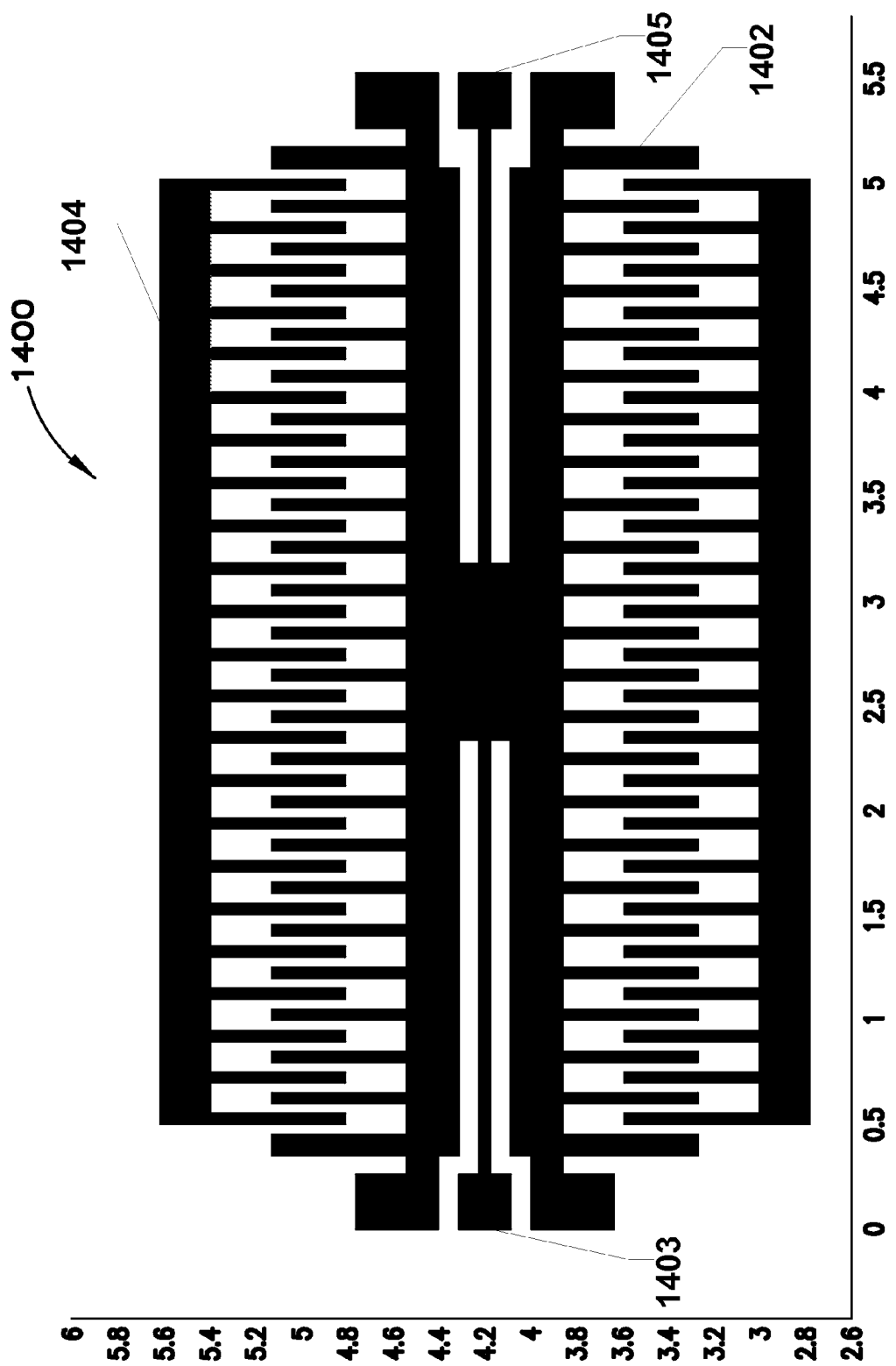
FIG. 14 is another thermal sensor including a Chevron thermal actuator self-calibrated using Electro Micro-Metrology methods.

The resonator 1400 shown in FIG. 14 incorporates a "Chevron" electro-thermal actuator for measuring planar deflections. The resonator 1400 has rotor 1402 suspended by a first cantilever support 1403 extending from a stator 1404 and a second cantilever support 1405 extending from the stator 1404. Static thermal expansion of the Chevron actuator is used to deflect the differential comb drive. The Chevron actuator consists of one or more angled flexures to create a preferential magnified deflection. More flexures can be used to increase stiffness and to reduce thermal noise. Such an Electro Micro-Metrology based approach allows the performance and design space to be pushed to achieve maximum thermal sensitivity. That is, capacitance is the most precise mode of measurement to date. For example, a change in capacitance on the order of zeptofarads (10-12 F) correlates to a comb drive displacement on the order of 10-13 m. It is well known that the relationship between stiffness and temperature is given by: $(\frac{1}{2})K(x2)=(\frac{1}{2})kBT$, where K is the stiffness, x is the amplitude of vibration, kB is Boltzmann's constant, and T is the temperature. However, unlike the previous efforts of others, by using Electro Micro-Metrology methods one is able to determine accurate and precise measurements of stiffness and displacement, which can be used to measure the absolute temperature T. The Electro Micro-Metrology methods render the use of any external reference temperature standard unnecessary.

What is claimed is:

1. A microfabricated variable capacitor, comprising:
a stationary stator portion including a plurality of electrically conductive plates each spaced apart from one another, each said pair of adjacent plates forming a channel therebetween, each of said plates being in a first common electrical communication;
a movable rotor portion including a plurality of electrically conductive blades each of said plurality of blades being in a second common electrical communication;
a stub in contact with the movable rotor portion; and
wherein said movable rotor portion is suspended relative to said stationary stator portion by flexible support portions that bias each of said blades vertically within a corresponding one of said channels, the stub displaces the movable rotor portion relative to the stationary stator portion against the bias of the flexible support portion, a portion of each said blade coacts with an adjacent said plate to store electrical charge, and the capacitance between the first electrical communication and the second electrical communication varies as said blades are displaced in a vertical direction.

2. The capacitor of claim 1, wherein said stub is configured to couple to an object.

3. The capacitor of claim 2 wherein said stub displaces said moving rotor portion dependent upon movement of said object.

4. The capacitor of claim 1 further comprising a flexible object having a first portion coupled to said stationary stator portion and a second portion coupled to said movable rotor portion, wherein said first portion is movable relative to said second portion.

5. The capacitor of claim 1, wherein said flexible support portions includes a first cantilever support extending from one end of said stator to said rotor and a second cantilever support extending from the opposite end of said stator to said rotor.

6. The capacitor of claim 5, wherein said first cantilever support is fixed at the one end and said second cantilever support is fixed at the opposite end.

7. The capacitor of claim 1, wherein said rotor includes a centrally located hub, and said blades are cantileveredly supported from said hub.

8. The capacitor of claim 7 which further comprises a cantilever arm supporting said blades, one end of said arm being coupled to said hub, each said blade extending from said arm in a direction that is generally transverse to the direction from the hub to the free end of said arm.

9. The capacitor of claim 1, wherein said plates are planar and said blades are planar.

10. The capacitor of claim 1, wherein said plates are circular about an axis and said blades are circular about the same axis.

11. The capacitor of claim 1 wherein said flexible support portion has a first spring constant corresponding to movement of said blades parallel to said plates, and a second spring constant corresponding to movement of said blades toward said plates, and the second spring constant is greater than the first spring constant.

12. A micro electro mechanical system sensor, comprising:
a comb drive having a stator portion with a plurality of stator plates each spaced apart from one another and a rotor portion including a plurality of rotor plates spaced apart from one another, the rotor portion being elastically suspended from said stator portion, the plurality of stator plates and the plurality of rotor plates forming a capacitor having a capacitance that varies with the vertical position of the rotor portion relative to the stator portion;
a membrane suspended proximate the comb drive, the membrane having a stub in physical contact with the rotor portion of the comb drive, the stub biasing the rotor portion to a first position having a first comb drive capacitance; and
wherein a movement of the membrane causes the stub to bias the rotor portion to a second position having a second comb capacitance.

13. The micro electro mechanical system sensor of claim 12 wherein the stator plates and the rotor plates are parallel.

14. The micro electro mechanical system sensor of claim 12 further comprising a packaging defining a pressure port and an otherwise fluid impervious environment.

15. The micro electro mechanical system sensor of claim 12 wherein the stator plates and the rotor plates are arcuate elements positioned at spaced distances from a common center.

16. The micro electro mechanical system sensor of claim 15 wherein the stub contacts the common center.

17. The capacitor of claim 12, wherein said rotor portion is elastically suspended from said stator portion by a first cantilever support extending from one end of said stator to said rotor and a second cantilever support extending from the opposite end of said stator to said rotor.

18. The capacitor of claim 17, wherein said first cantilever support is fixed at the one end and said second cantilever support is fixed at the opposite end.

19. The capacitor of claim 12, wherein said rotor portion includes a centrally located hub, and said rotor plates are cantileveredly supported from said hub.

20. The capacitor of claim 19 which further comprises a cantilever arm supporting said rotor plates, one end of said arm being coupled to said hub, each said rotor plate extending from said arm in a direction that is generally transverse to the direction from the hub to the free end of said arm.

21. The capacitor of claim 12, wherein said stator plates are planar and said rotor blades are planar.

22. The capacitor of claim 12, wherein said stator plates are circular about an axis and said rotor plates are circular about the same axis.

\* \* \* \* \*